United States Patent [19]
Forlini et al.

[11] 3,744,126
[45] July 10, 1973

[54] METHOD FOR CONTROLLING BOWING IN LIGHT VALVES

[75] Inventors: Matthew Forlini, Ozone Park; Francis C. Lowell, Huntington Station, both of N.Y.

[73] Assignee: Research Frontiers Incorporated, Plainview, N.Y.

[22] Filed: July 26, 1971

[21] Appl. No.: 166,014

[52] U.S. Cl.......... 29/592, 29/421, 161/45, 264/2, 264/88, 350/150, 350/267
[51] Int. Cl............................... H01s 4/00
[58] Field of Search.............. 29/421, 422, 592; 350/147, 267, 150, 156, 276, 160; 264/1, 2, 4, 88, 94; 161/45; 52/573; 65/58

[56] References Cited
UNITED STATES PATENTS

| | | | |
|---|---|---|---|
| 1,370,974 | 3/1921 | Kirlin | 161/45 |
| 2,756,467 | 7/1956 | Etling | 161/45 |
| 3,470,049 | 9/1969 | Reusch | 161/45 X |
| 3,535,098 | 10/1970 | Babcock | 65/58 X |
| 3,592,526 | 7/1971 | Dreyer | 350/159 |
| 3,655,267 | 4/1972 | Forlini | 350/150 |

FOREIGN PATENTS OR APPLICATIONS

| | | |
|---|---|---|
| 487,032 | 6/1938 | Great Britain |
| 1,108,593 | 4/1968 | Great Britain |
| 1,138,992 | 1/1969 | Great Britain |

*Primary Examiner*—Charles W. Lanham
*Assistant Examiner*—V. A. DiPalma
*Attorney*—Stephen F. Feldman

[57] ABSTRACT

A method is disclosed for controlling the bowing of the walls of light valves. This is especially necessary when large sized valves contain a liquid suspension. To reduce this distortion of shape and thereby eliminate bowing, an amount of fluid is withdrawn from the cell prior to sealing the cell hermetically. Fluid is withdrawn, thereby reducing the pressure on the inside of the walls, until the pressure at least one point inside the walls, and preferably toward the lower center of a light valve positioned vertically, is substantially equal to the atmospheric pressure on the outside of the light valve walls.

25 Claims, 4 Drawing Figures

PATENTED JUL 10 1973

3,744,126

INVENTORS
MATTHEW FORLINI
FRANCIS C. LOWELL
BY
Stephen E. Feldman
ATTORNEY

METHOD FOR CONTROLLING BOWING IN LIGHT VALVES

BACKGROUND OF THE INVENTION

This invention refers to bowing of thin plates (sometimes referred to herein as walls) and especially to bowing of the thin, transparent glass plates used as the walls in light valves (cells) of the type in which a liquid suspension of particles is confined in a space between two plates of glass. In light valves of this type, electrically conductive, transparent coatings are applied either to the inside or outside surface of the plates so that an electrical potential can be applied across the suspension in the space between the plates in order to activate and operate the light valve. In many applications, for example, when the valve is used as a window in a building, or as a shutter in a camera, the cell is used in a vertical position. If the vertical dimension of the cell walls is small, for example, 1 inch, as it might be in a camera shutter, the pressure of the liquid in the interior of the cell, which includes the hydrostatic pressure of the liquid does not distort the shape of the plates to an appreciable, discernable extent because the hydrostatic head is small. However, when the vertical dimension of the cell is large, for example, 12 inches or larger, the hydrostatic pressure of the liquid suspension (the pressure due to the weight of the column of liquid) causes a pressure difference to exist between the inside and outside of a cell causing a net outward force on the plates which bows and distorts the plates into a curved surface. This happens to a certain extent also in any cell in which the vertical dimension of the cell is large compared with the thickness of the plates. It should be appreciated that although one usually speaks of hydrostatic pressure in relation to the pressure caused by the weight of a column of water, the term as used herein refers to the pressure caused by the weight of any fluid, for example, an organic liquid. The effect is pronounced, for example, in a vertical cell having two ¼ inch or less thick glass plates, and whose length and width dimensions are, for example, 2 feet by 2 feet, and having a liquid layer about 20 mils thick between the plates. The aforesaid bowing or distortion of the plates will lead to a light valve that is not uniform in suspension thickness. The plates will be separated more at one point than at another point. Therefore, the thickness of the suspension through which the light passes will be different in different parts of the cell. This will result in non-uniform optical density from point to point in the cell. For example, in a window, this produces a darker area in the center or below the center of the cell, and a lighter area around the edges of the cell or at the top, of the cell. The bowing also has the undesirable result, since it creates a curved surface, of producing a lens effect to further distort transmission of light through the light valve. Another undesirable effect of the bowing is that the non-uniform separation of the bowed electrodes produces non-uniform electric fields in different areas of the cell. The light valve opens more where the separation is small because the field is larger there. The valve opens less where the separation is large because the field is smaller. This adds to the darkness of the cell in the bulged area, and adds to the relative lightness along the edges or at the top of the cell. It is thus an object of this invention to eliminate or reduce this bowing and resulting distortion in cells and devices having walls not strong enough or too thin to prevent bowing, and especially in the walls of light valves.

SUMMARY OF THE INVENTION

A method is disclosed for reducing bulging (bowing) caused by fluid pressure which occurs in thin, glass cells, such as light valves, especially when they are used in a vertical position with a liquid substance between the cell walls. To eliminate the bowing, an amount of fluid is withdrawn from between the cell walls (i.e., from inside the light valve) under conditions whereby the atmosphere surrounding the cell cannot enter the cell and then the cell is sealed hermetically. This reduces the pressure inside the cell so that at at least one point (usually toward the lower center of a cell) the internal cell pressure is preferably approximately equal to the corresponding pressure outside the valve. Alternatively, a predetermined, correct amount of fluid is placed inside the cell and by either the aforesaid suction or squeezing methods, the fluid is caused to occupy substantially all of the volume between the light valve walls without causing bowing to occur.

PREFERRED EMBODIMENT OF THE INVENTION

Figure 1:
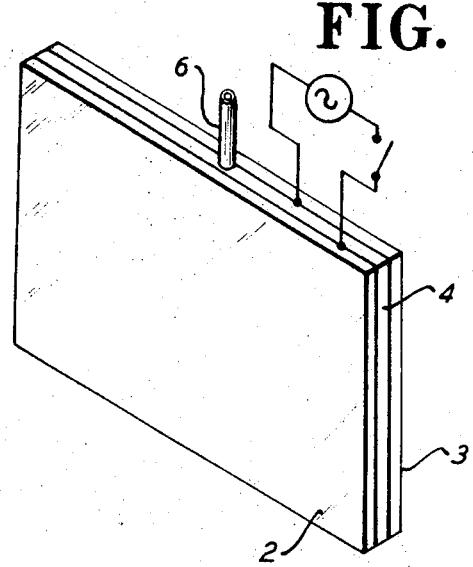
FIG. 1 is a perspective view of a light valve.
Figure 2:
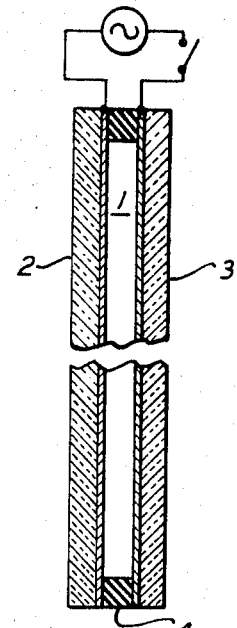
FIG. 2 is a cross-sectional view of the light valve of FIG. 1 before it has been filled with fluid suspension.

In FIGS. 1 and 2 are shown a typical light valve involving this invention. The light valve consists of two transparent plates 2 and 3 which are preferably constructed of plastic, glass, or other strong transparent material. These plates are positioned so they are substantially parallel and are then sealed together by a suitable sealant 4 which is placed around the entire periphery of the light valve to form an enclosed cell (1) inside the valve. A small tube 6 is inserted at one end of the valve preferably the upper end (in FIG. 1). This tube is inserted so it creates a free passage between the outer atmosphere and cell 1. The entire cell is completely sealed except for passage 7 through tube 6.

The liquid suspension is then poured into the cell through tube 6 so that it completely fills the entire cell. The suspension contains particles which change their orientation when an electric or magnetic field is applied to the cell. This substance will be described in more detail hereinafter. The filling can be done when the cell is in a vertical position with plates 2 and 3, vertical as shown in FIG. 2, or it can be done with the cell in a horizontal position. The suspension itself, which is described in more detail in U.S. Pat. application Ser. No. 25,541 entitled "Light Valve with Flowing Fluid Suspension" and assigned to the assignee of the present invention is one that contains particles of a material such as herapathite, in a carrier such as isopentyl acetate. The particles of herapathite will change their orientation on the application of an electric or magnetic field. To apply such a field to the suspension, the walls of the cell are coated with a transparent, electrically conductive material and then these coatings are connected by appropriate circuitry, as shown in FIG. 1, to a source of voltage. The suspension which normally (i.e., in the absence of such field) appears dark (almost opaque) so as to let very little light radiation pass therethrough, becomes almost transparent, when a voltage is applied. It becomes transparent because the particles in suspension, the herapathite particles, become oriented on the application of the field so that they now block very little light passing through the cell. When the voltage source is removed, Brownian movement causes the particles to become disoriented once again and the suspension again becomes dark.

As aforementioned, one of the problems with these cells is that when plates 2 and 3 are vertically oriented and are more than a few inches in height, and especially when they are a few feet in height, the plates will tend to bow and distort the proper functioning of the light valve. This is more clearly shown in FIG. 3. It will be appreciated that in FIG. 3 the bowing and usual relative thickness of the layer of fluid suspension have been greatly enlarged to accentuate the effect for purposes of illustration. This bowing will occur when the panel is filled with fluid suspension; the bowing is caused by the pressure of the fluid in the cell being greater than the pressure outside the cell. The difference is approximately equal to the pressure caused by the weight of the column of liquid in the cell. Stated another way, the liquid in such a cell is at the equivalent of atmospheric pressure plus its hydrostatic pressure, whereas, outside the cell only atmospheric pressure exerts a force on the cell walls. The actual bowing effect is aggravated by the fact that the cell walls can bend more near their centers than at their edges because the edges are cemented to each other. This hydrostatic pressure of the fluid increases from the top to the bottom of the cell due to the weight of the fluid in the cell. The bowing will also be most pronounced slightly below the midpoint of the cell because of the weight of the fluid (hydrostatic pressure). The bowing can lead, as aforementioned, to uneven light transmission effects of the cell due to uneven distribution of fluid suspension and to lens effects. Also, this non-uniform thickness of the fluid suspension will cause a variation in field gradient as well, which can cause a pronounced variation in transmission response from point to point when the cell is activated. Also, bowing and distortion of the glass walls can cause fracturing of the walls of the cell, rupturing of the seals and other serious damage. Thus, it is of the utmost importance that the cell walls be returned to, or kept in approximately the same flat, parallel relationship as before the fluid was added to the cell so that the cell is able to operate properly. It will be appreciated, of course, that this invention can also be applied to light valves where one wishes to maintain any predetermined spacing even a tapered or other non-constant spacing between the cell walls.

The term "fluid" shall include but not be limited to fluid suspensions. The term "liquid" shall include but not be limited to liquid suspensions.

It should also be noted that although only one opening is shown in the accompanying drawing through which fluid may pass, it is often desirable to have a second opening (not shown in the drawings) usually at or near the top of the light valve to allow gas such as air to escape from the light valve while liquid suspension, for example, is placed in the cell. Such second opening, if used, should preferably be hermetically sealed before performing the suction or squeezing methods and final hermetic seal herein described.

The method of this invention for solving bowing will now be described in detail.

Figure 3:
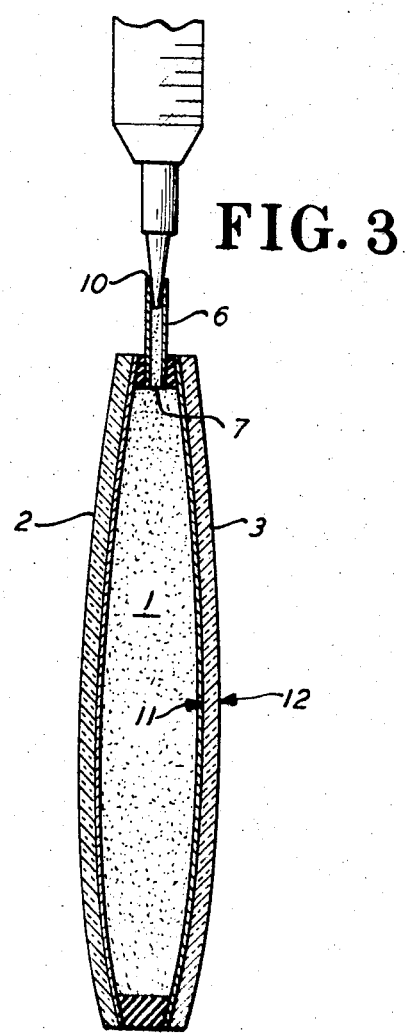
FIG. 3 is a cross-sectional view of the light valve of FIG. 1 after it has been filled with fluid and before the pressure has been relieved by the method of this invention.
Figure 4:
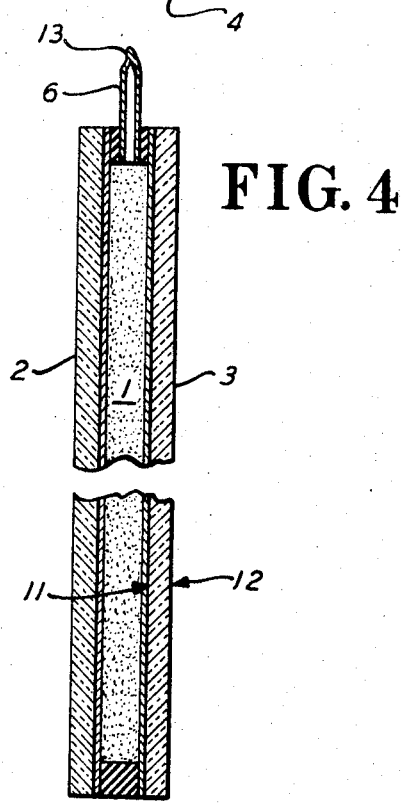
FIG. 4 is a cross-sectional view of the light valve of FIG. 1 after the pressure has been relieved by the method of this invention.

Utilizing tube 6, the cell is completely filled with liquid suspension. In filling the cell it is preferable that there be no air bubble or bubbles remaining in the liquid suspension, or cell or in tube 6. However, if one or a few small bubbles, or a small air space remains it is tolerable, provided that the volume of these bubbles or of the air space is small compared to the total volume of the cell. The cell, being now completely filled with liquid suspension, will begin to bulge and will assume the shape as shown in FIG. 3 with the plates 2 and 3 being bowed and distorted outwards because of pressure differential caused by the hydrostatic pressure of the liquid suspension. The next step in the method of this invention is to apply a controlled vacuum to the open end 10 of tube 6 to reduce the pressure of the liquid in the tube and in the interior of the cell. A suction device to apply this vacuum, (as will be described hereinafter) can be a suction pump or other similar device. The suction device is connected in an air tight manner. For example, the suction device can contain a tube which is forced into tube 6. The suction device is then operated and liquid is removed. The pressure in the cell will thereby be reduced and plates 2 and 3 will begin to return to their original flat shape and the bowing will begin to be relieved. Fluid is removed until the walls assume a flat, parallel shape and relationship to one another, as shown in FIG. 4. In other words, enough liquid in the cell will be removed under suction conditions until the pressure of the liquid at the lower center of the cell 11 (place of maximum bulge) is reduced to approximately the atmospheric pressure on the outside 12 of the cell on the opposite side of the cell wall.

The hydrostatic pressure in the liquid increases linearly in the downward direction from the upper level of the liquid and is approximately constant in any one horizontal plane. The bulging however, does not increase linearly from the top of the panel to the bottom. Bulging is not constant in any one horizontal plane, because the sealant around the edges of the cell binds the two glass plates to each other and constrains the plates from bulging at the edges. The plates therefore bulge into a shape that is determined by the shape and size of the cell, the thickness of each of the glass plates, the elastic constants of the plates, their specific constraints, and the specific gravity of the liquid suspension. The plates bulge into a generally spherical shape with the crown of the bulge being generally below the geometric center of the cell.

Further detail will now be presented to explain some of many examples of suction devices that can be used with this invention, and how these devices are used. A hypodermic syringe, as shown in FIG. 3, can be attached or fastened tightly to the open end 10 of the tube 6, as by inserting it into the tube so that no air can enter the cell. The plunger of the syringe is depressed before being attached to the open end of the tube. The plunger is then slowly withdrawn to withdraw fluid into it until the proper pressure is obtained inside the cell and the plates 2 and 3 are substantially flat. This can be done by visual observation or various gauges. After the cell walls are flat, the end of the tube is then sealed off as shown in FIG. 4 at point 13 and then the hypodermic syringe or other suction device is removed. A sturdy rubber bulb can be used in place of the hypodermic syringe by first compressing the bulb by hand and then fastening the open end of the bulb to the open tube 6. The bulb is then allowed to expand under its own elasticity by slowly releasing the operator's hand so that liquid is drawn into the bulb until the pressure inside the cell is adjusted so that the plates 2 and 3 are flat. When they are flat, the tube 6 is sealed off as at 13 in FIG. 4 and the bulb is removed. As aforementioned, any other device which is a source of reduced pressure or vacuum or partial vacuum can be attached to the open end of the tube 6 to accomplish the same purpose.

One convenient method for sealing off the end of the tube 6 is to make the tube out of glass and seal it off using a conventional method known in the art, of glass blowing, that is, by heating it and then pinching the glass tube so that it seals itself. Another method is to use a soft metal tube, for example, copper or soft brass, and to seal the tube by squeezing it closed with an appropriate tool, such as a crimping tool or a pair of pliers. The tube can be bent almost to 180° and then sealed at the bend by pressure. Also, suitable adhesives can be used to seal the tube. The important consideration is that the tube be hermetically sealed against fluid entering or leaving enclosure 1.

When liquid is drawn (sucked) out of the top of the cell as taught in this invention, the atmospheric pressure equivalent of the liquid remaining inside the cell is reduced to a fraction of what it was. The hydrostatic pressure of the liquid in the cell is of course unchanged, but now the total pressure inside the cell, the hydrostatic pressure plus the reduced atmospheric pressure equivalent of the liquid is reduced. It will be appreciated that the pressure in the cell is not constant throughout since the hydrostatic pressure increases downwardly in the cell. However, the point of major interest is the point of maximum bulge, which as aforementioned, will occur below the center of the cell. Thus the atmospheric pressure is reduced until the cell is flat at this point of maximum bulge.

However, the pressure on the inside of the plates above the midpoint is less than the outside atmospheric pressure, and the inside pressure on the plates below the midpoint is greater than the outside atmospheric pressure. The plates above the midpoint tend to bulge inwardly. However, in practice it is found that this inward bulging of the upper portion of the plates, is negligible for most applications, e.g., windows of moderate size and television contrast enhancing filters. The invention disclosed herein suceeds in reducing all bulges to the point where they are not noticeable in most applications.

The foregoing analysis enables us to calculate the approximate reduction in pressure, $\Delta P$, that must be made by the suction or vacuum device that is used in this invention, assuming, for simplicity, that the pressure in the cell when vertical at half of its maximum height equals standard atmospheric pressure (760 mm of mercury at sea level). The calculation is made by the formula: $\Delta P = \frac{1}{2} gHD$ where $\Delta P$ is the reduction in pressure in dynes per square centimeter per second per second; $H$ is the vertical distance in centimeters, between the upper level of the liquid to the bottom of the liquid in the cell; and $D$ is the density of the liquid suspension in grams per cubic centimeter.

For example, if a rectangular cell is held with two of its edges vertical, and the vertical dimension of the inside of the cell is 100 centimeters; and the density of the liquid suspension is 1.5 grams per cubic centimeter, and the acceleration of gravity is 980 centimeters per second per second; then the drop in pressure $\Delta P$, that should be produced by the suction device at the top of the panel is 73,500 dynes per square centimeter, which is approximately 0.073 atmosphere of pressure.

Alternatively, instead of withdrawing fluid from the cell, the walls of the cell can be squeezed together to force air out of the cell under conditions where no air can enter the cell to cause a reduction in the pressure in the cell.

Briefly, restating the operation once again, and amplifying thereon, the light valve is filled with liquid suspension, either in the horizontal or vertical position, and its walls are either squeezed together to eliminate the bowing or vacuum applied to accomplish the same objective. By either method, air is preferably all forced out of the cell together in some instances with some liquid, and the cell is hermetically sealed, with liquid filling all or substantially all of its inner volume. If the walls of the cell are to be squeezed together, a mechanical guide fixture or similar squeezing apparatus can be employed. Whether one uses suction or squeezing, and whether one fills the cell in the horizontal or vertical position, this invention will reduce the bulging problem. It will also be appreciated that when the exact capacity of the cell is known, the exact, correct amount of fluid can be placed in the cell. The aforesaid exact amount of fluid is the amount that would be left in the cell after the bulging is eliminated as previously described. Of course, before the cell is corrected to eliminate bulging this amount of liquid will not completely fill the cell; the remainder of the panel will probably be filled with gas or air. Bulging will of course take place for the reasons previously cited. The same methods as previously discussed will be used to fill the cell and correct for bulging, e.g., either squeezing or withdrawing by suction. However, in both cases only the gas or air will be withdrawn; no liquid will be removed. The liquid will simply redistribute itself through the inside of the panel once the air is removed. Now, as before, the pressure of the liquid at the point where the maximum bulge was, will approximately equal the atmospheric pressure outside the panel. The bulging will then be eliminated. This procedure simplifies filling of large numbers of cells as in mass production.

The significant feature of this invention is that regardless of the distortion due to pressure, the walls are returned to almost their original shape.

It wll be appreciated thus, that a highly efficient way of reducing the bowing in light valves is provided.

While specific embodiments of this invention have been illustrated, it will be appreciated that the invention is not limited thereto, since many modifications may be made by one skilled in the art which fall within the true spirit and scope of the invention.

We claim:

1. The method of causing at least one wall of a deformed cell to return substantially to its undeformed condition by reducing the pressure of fluid inside the cell where the pressure of the fluid is at least at one point inside the wall of the cell greater than pressure of fluid at a corresponding point on the other side of the wall outside the cell comprising the steps of:

causing the wall to return to its undeformed condition by reducing the pressure inside the cell by removing fluid until the pressure of the fluid inside the cell at that point is substantially equal to the pressure of the fluid outside the cell at the corresponding point, and hermetically sealing the cell.

2. The method of claim 1 wherein prior to reducing the pressure inside the cell by removing fluid the pressure at the point inside the cell is caused by the sum of hydrostatic pressure and a pressure equal to atmospheric pressure and the pressure at the corresponding point outside the cell is caused by atmospheric pressure.

3. The method of claim 2 wherein that part of the pressure inside the cell caused by the pressure equal to atmospheric pressure is reduced by removing fluid so that the part of the pressure equal to atmospheric pressure plus the hydrostatic pressure at the point inside the cell are substantially equal to the atmospheric pressure outside the cell.

4. The method of claim 3 wherein the fluid in the cell comprises a liquid.

5. The method of claim 4 wherein the fluid removed is some of the liquid.

6. The method of claim 3 wherein the fluid comprises a liquid and a gas.

7. The method of claim 6 wherein the fluid removed comprises the gas.

8. The method of claim 6 wherein the fluid removed comprises the gas and some liquid.

9. The method of claim 8 wherein the fluid is withdrawn under suction conditions.

10. The method of claim 8 wherein the fluid is removed by reducing the volume of the cell without allowing any other fluid to enter the cell.

11. The method of claim 9 including means defining the cell comprising two interconnected substantially parallel, flat walls at least one of which is transparent.

12. The method of claim 11 wherein the cell comprises a light valve.

13. The method of claim 12 wherein the liquid inside the cell comprises a liquid suspension having particles in suspension which can have their orientation changed by the application of an electric or magnetic field to control the passage of radiation through the cell.

14. The method of claim 13 wherein the liquid at the point in the cell at which its pressure is greater than the pressure of the liquid outside the cell causes the walls of the cell to bulge outwardly, and wherein the step of reducing the pressure causes the walls to return to their flat, parallel form.

15. The method of claim 14 wherein the fluid outside the cell comprises air at atmospheric pressure.

16. The method of claim 15 wherein a tube is mounted to connect with the interior of the cell and whereby the fluid is removed through said tube.

17. The method of claim 16 wherein the step of removing fluid includes applying a suction device to the tube so as to prevent fluid such as air from entering the cell while the fluid inside the cell is being removed.

18. The method of claim 17 wherein hermetically sealing the cell includes the step of collapsing the tube so that it is hermetically sealed.

19. The method of claim 18 wherein the step of reducing the pressure is effected when the cell is in a substantially vertical orientation with the walls of the cell vertically oriented.

20. The method of claim 19 wherein the suction device comprises a syringe.

21. The method of claim 10 including means defining the cell comprising two interconnected substantially flat, parallel walls.

22. The method of claim 21 wherein the fluid is removed by moving the walls toward each other and permitting some fluid to be ejected through a means comprising an opening.

23. The method of claim 22 wherein the walls of the cell are squeezed together to cause the ejection of fluid.

24. The method of filling a cell where one wall is deformable so that the cell will not become deformed when fluid is placed therein comprising the steps of:

determining substantially the maximum amount of fluid which when placed in the cell will enable the cell to remain in substantially its original undeformed shape, where if more than this amount of fluid were placed in the cell the walls of the cell would deform, the determination being made by determining the amount of fluid that will remain in a cell which had deformed walls where fluid was removed to return the walls of the cell to their original undeformed condition where the deformation is caused by the pressure of the fluid inside the wall at a point being greater than the pressure of fluid at a corresponding point on the otherside of the wall outside of the cell, filling the cell with this amount of fluid, and hermetically sealing the cell.

25. The method of claim 24 wherein as the cell is being filled with the liquid the cell is positioned in a substantially horizontal direction.

* * * * *

UNITED STATES PATENT OFFICE
CERTIFICATE OF CORRECTION

Patent No. 3,744,126          Dated July 10, 1973

Inventor(s) Matthew Forlini and Francis C. Lowell

It is certified that error appears in the above-identified patent and that said Letters Patent are hereby corrected as shown below:

In the abstract:

Line 8, between "at" and "least" -at- should be inserted.

Signed and sealed this 7th day of January 1975.

(SEAL)
Attest:

McCOY M. GIBSON JR.
Attesting Officer

C. MARSHALL DANN
Commissioner of Patents